Figure 1:
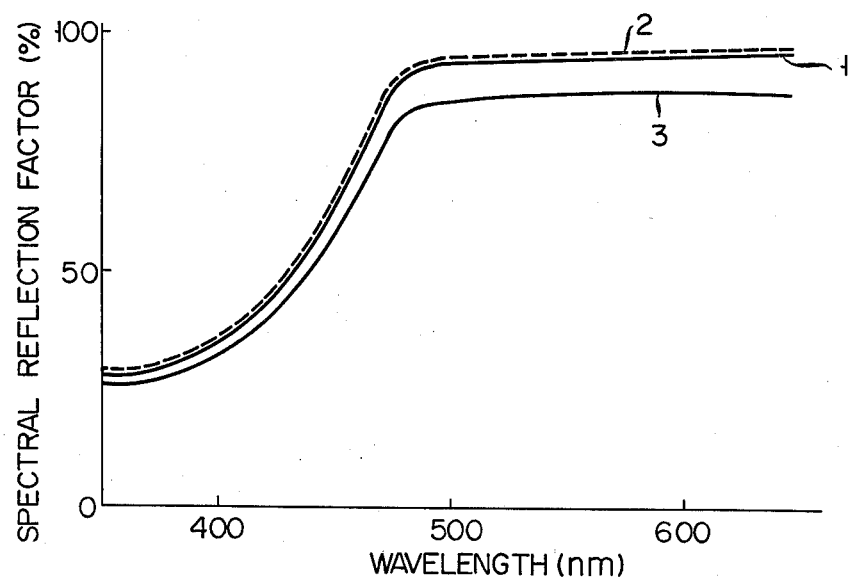

›
United States Patent [19]

Oikawa et al.

[11] 4,208,299
[45] Jun. 17, 1980

[54] METHOD OF PREPARING ZINC SULFIDE PHOSPHOR COACTIVATED WITH COPPER AND GOLD

[75] Inventors: Mitsuhiro Oikawa, Kawasaki; Susumu Matsuura, Yokohama, both of Japan

[73] Assignee: Tokyo Shibaura Electric Co., Ltd., Kawasaki, Japan

[21] Appl. No.: 873,957

[22] Filed: Jan. 31, 1978

[30] Foreign Application Priority Data

Jan. 31, 1977 [JP] Japan .................................. 52/8748

[51] Int. Cl.$^2$ ............................................. C09K 11/30
[52] U.S. Cl. ............................................. 252/301.6 S
[58] Field of Search .................................. 252/301.6 S

[56] References Cited

U.S. PATENT DOCUMENTS

| | | | |
|---|---|---|---|
| 2,623,858 | 12/1952 | Kroger | 252/301.6 S |
| 2,956,028 | 10/1960 | Davis | 252/301.6 S |
| 3,922,233 | 11/1975 | Torii et al. | 252/301.6 S |
| 4,038,205 | 7/1977 | Minnier et al. | 252/301.6 S |
| 4,151,442 | 4/1979 | Koga et al. | 252/301.6 S X |

OTHER PUBLICATIONS

Kroger et al., "Philips Research Reports" vol. 7, 1952 pp. 241–250.

*Primary Examiner*—Jack Cooper
*Attorney, Agent, or Firm*—Cushman, Darby & Cushman

[57] ABSTRACT

A zinc sulfide phosphor having no segregated free sulfides of copper and gold on the surface layer thereof, which contains 0.003 to 0.03% by weight of copper and 0.01 to 0.2% by weight of gold as co-activators and further 0.0025 to 0.04% by weight of aluminum each on the basis of the zinc sulfide. The chromaticity of the emission from the phosphor is in the range of $x=0.310$ to 0.350 and $y=0.560$ to 0.600 on CIE chromaticity coordinates.

A method for the preparation of this zinc sulfide phosphor which comprises adding aluminum fluoride as the aluminum ion source and ammonium iodide as the flux compound to powdery raw material for phosphor composed of zinc sulfide and the activator compounds, and firing the formed mixture in a reducing sulfurous atmosphere, thereby removing any segregated free sulfides of copper and gold.

3 Claims, 2 Drawing Figures

METHOD OF PREPARING ZINC SULFIDE PHOSPHOR COACTIVATED WITH COPPER AND GOLD

The invention relates to a phosphor emitting green light, particularly to a green-emitting phosphor suitable for the fluorescent screen for cathode ray tubes installed in color television sets.

In the prior art, zinc-cadmium sulfide phosphors activated with copper, CdZnS:Cu, were used as the phosphor emitting green light for such a use, but such phosphors are already almost obsolete by the reason of the environmental pollution caused by cadmium. At the present time, zinc sulfide phosphors activated with copper, ZnS:Cu, are used as the green-emitting phosphor for such fluorescent screens as the replacement. However, the distribution of the emission spectrum of the ZnS:Cu phosphor is not freely controllable and the chromaticity deviates rather to the side of bluish green color from that of the CdZnS:Cu phosphor. Therefore, cathode ray tubes with a fluorescent screen of such a phosphor have a drawback that they require considerably higher current of electron beams in order to be excited as compared with those using aforementioned zinc-cadmium sulfide phosphors activated with copper when a specified non-chromatic image with an equal brightness is to be reproduced on the screens.

The object of the present invention is to provide a novel phosphor emitting green light with a chromaticity similar to that emitted from conventional zinc-cadmium sulfide phosphors activated with copper and showing high emitting efficiency for the excitation by cathode rays. The invention further provides the method for the preparation thereof.

The chemical composition of the zinc sulfide phosphor co-activated with copper and gold according to the present invention is expressed by the general chemical formula $$ZnS:Cu_l Au_m Al_n,$$

where $l$ is a number corresponding to the amount of copper from 0.003 to 0.03% by weight based on ZnS, $m$ is a number corresponding to the amount of gold from 0.01 to 0.2% by weight based on ZnS, and $n$ is a number corresponding to the amount of aluminum from 0.0025 to 0.04% by weight based on ZnS.

The emission from the phosphor has a characteristic chromaticity in the range of $x=0.310$ to $0.350$ and $y=0.560$ to $0.600$ on CIE chromaticity coordinates and the phosphor crystallites bear no segregation of free sulfides of copper and gold.

Figure 2:
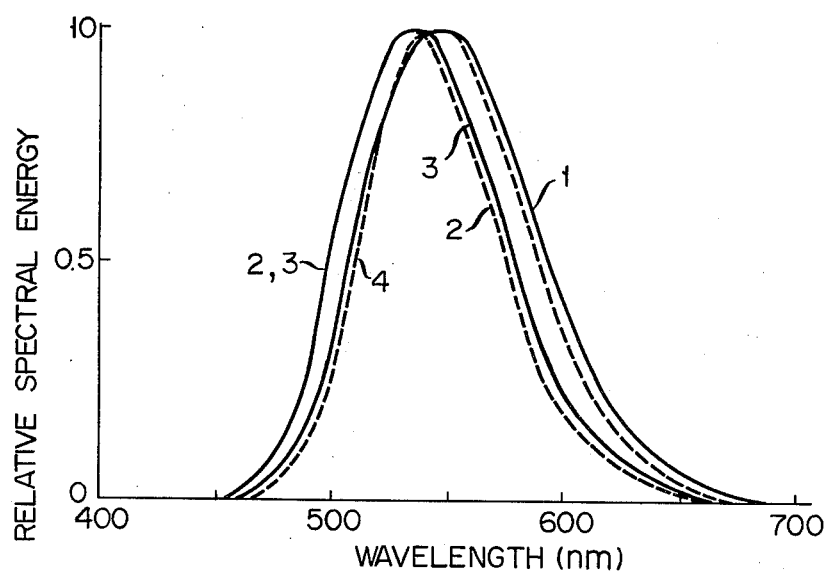

This invention can be more fully understood from the following detailed description when taken in conjunction with the accompanying drawings, in which:

FIG. 1 is a graph showing the spectral reflection factors of the green-emitting phosphors; and FIG. 2 is a graph showing the relative spectral energy distributions of the emission from the green-emitting phosphors excited by cathode rays.

The zinc sulfide phosphor co-activated with copper and gold of the present invention is prepared by a novel method suitable for effectively impregnating the phosphor crystallites with the activators, or, in particular, with the gold activator. The emission from the phosphors of the invention is almost identical in the chromaticity as that from the copper-activated zinc-cadmium sulfide phosphors, because the gold activator is uniformly distributed throughout the phosphor crystallites without forming segregation of the free sulfide on the surface.

Conventionally, copper-activated zinc sulfide phosphors are prepared by adding a halide, in particular a chloride, of an alkali metal or an alkaline earth metal as a flux compound to zinc sulfide together with the activator and an aluminum compound such as aluminum nitrate as a source of aluminum ions followed by firing at a temperature from 900° C. to 1,000° C. in a reducing sulfurous atmosphere. However, no satisfactory results are obtained in the manufacture of a zinc sulfide phosphor co-activated with copper and gold by the conventional process described above. That is, the copper activator alone predominantly penetrates into the phosphor crystallites while the penetration of the gold activator with a larger ionic radius into the crystallites is extremely difficult. Accordingly, segregation of free gold sulfide is formed on the surface of the phosphor crystallites. The phosphor prepared by the above process is discolored in grey and has low emitting efficiency, and the emission has a chromaticity in the bluish green range similar to that of conventional copper-activated zinc sulfide phosphors.

It is possible to prepare a zinc sulfide phosphor co-activated with copper and gold by the process of the present invention in which aluminum fluoride is used as the source of aluminum ions and ammonium iodide is used as the flux compound.

Illustrating the inventive process in further detail, a blend is prepared from powdery raw material for phosphor composed of zinc sulfide and activator compounds such as chloroauric acid and copper sulfate by admixing with 0.1 to 1.0% by weight of aluminum fluoride and 0.1 to 1.0% by weight, each on the basis of the weight of the raw material, of ammonium iodide, and the formed blend is then fired in a reducing sulfurous atmosphere. The amounts of aluminum fluoride and ammonium iodide are not limitative but the ranges above referred to are preferred in order to obtain homogeneous distribution of the copper and gold activators in the phosphor crystallites. It is noted that the above amount of aluminum fluoride corresponds to 0.032 to 0.32% by weight when calculated on the basis of ZnS. However, the amount of aluminum distributed in the finished phosphor crystallites depends on the amounts of the copper and gold activators and, consequently, the amount of aluminum penetration in the phosphor crystallites is as low as 0.0025 to 0.04% by weight based on the zinc sulfide.

Not only the copper activator but also the gold activator can easily penetrate into the phosphor crystallites in the process of manufacturing according to the present invention and a zinc sulfide phosphor co-activated with copper and gold is obtained as a crystalline powder of pale yellowish green.

Then, the testing results for the zinc sulfide phosphors with varied amounts of the copper and gold activators are shown in the following Table 1 in the purpose of comparison for CIE chromaticity coordinates, the relative brightness of the phosphors by the excitation with cathode rays of 10 kV and 1 $\mu A/cm^2$ and the relative brightness of the non-chromatic images on 18-inch cathode ray tubes of color television sets excited by constant current of electron beams. The values of the relative brightness set out in the table are expressed in percentages taking brightness of a conventional copper-activated zinc sulfide phosphor, ZnS:Cu, as the basis.

Table 1
Relationships between the Concentration of the Activators and the Characteristics of the Phosphor

| Cu Content (% by weight) | Au Content (% by weight) | CIE Chromaticity coordinates x | y | Relative Brightness by Excitation with Cathode Rays, 10kV, 1μA/cm$^2$ | Relative Brightness of Non-chromatic Images on 18 in. Cathode Ray Tube |
|---|---|---|---|---|---|
| 0.0011 | 0.0049 | 0.275 | 0.585 | 84 | 88 |
| 0.0029 | 0.0049 | 0.277 | 0.592 | 90 | |
| 0.0048 | 0.0048 | 0.282 | 0.591 | 97 | |
| 0.0098 | 0.0050 | 0.284 | 0.606 | 99 | 98 |
| 0.030 | 0.0049 | 0.286 | 0.611 | 93 | |
| 0.051 | 0.0049 | 0.282 | 0.599 | 86 | |
| 0.0010 | 0.010 | 0.277 | 0.581 | 85 | |
| 0.0029 | 0.0098 | 0.274 | 0.601 | 92 | 99 |
| 0.0048 | 0.0098 | 0.289 | 0.596 | 96 | 103 |
| 0.0099 | 0.010 | 0.297 | 0.595 | 96 | 105 |
| 0.016 | 0.010 | 0.310 | 0.598 | 97 | 107 |
| 0.029 | 0.0099 | 0.287 | 0.598 | 94 | 101 |
| 0.048 | 0.010 | 0.278 | 0.604 | 85 | |
| 0.0010 | 0.051 | 0.364 | 0.568 | 84 | 98 |
| 0.0031 | 0.051 | 0.344 | 0.574 | 90 | 101 |
| 0.0047 | 0.049 | 0.341 | 0.577 | 97 | 109 |
| 0.0098 | 0.049 | 0.338 | 0.582 | 98 | 110 |
| 0.029 | 0.048 | 0.312 | 0.588 | 93 | 104 |
| 0.049 | 0.050 | 0.294 | 0.594 | 86 | 94 |
| 0.0009 | 0.080 | 0.368 | 0.558 | 83 | 96 |
| 0.0029 | 0.081 | 0.350 | 0.571 | 90 | 102 |
| 0.0050 | 0.083 | 0.342 | 0.574 | 93 | 106 |
| 0.0098 | 0.080 | 0.335 | 0.578 | 95 | 107 |
| 0.029 | 0.083 | 0.316 | 0.589 | 89 | 100 |
| 0.049 | 0.082 | 0.302 | 0.588 | 82 | 92 |
| 0.0011 | 0.12 | 0.366 | 0.551 | 80 | |
| 0.0030 | 0.12 | 0.361 | 0.558 | 86 | 101 |
| 0.0051 | 0.12 | 0.342 | 0.573 | 90 | 106 |
| 0.0098 | 0.11 | 0.325 | 0.581 | 89 | 104 |
| 0.031 | 0.12 | 0.304 | 0.587 | 85 | 99 |
| 0.048 | 0.12 | 0.299 | 0.591 | 81 | |
| 0.0011 | 0.15 | 0.371 | 0.546 | 75 | |
| 0.0031 | 0.14 | 0.360 | 0.556 | 80 | |
| 0.0049 | 0.14 | 0.351 | 0.572 | 85 | 104 |
| 0.0099 | 0.14 | 0.337 | 0.577 | 86 | 102 |
| 0.029 | 0.15 | 0.321 | 0.580 | 84 | 100 |
| 0.048 | 0.14 | 0.312 | 0.581 | 80 | 94 |
| 0.0010 | 0.20 | 0.363 | 0.543 | 75 | |
| 0.0031 | 0.20 | 0.358 | 0.557 | 80 | 98 |
| 0.0050 | 0.19 | 0.355 | 0.554 | 84 | 102 |
| 0.0099 | 0.20 | 0.344 | 0.569 | 84 | 101 |
| 0.028 | 0.19 | 0.332 | 0.573 | 82 | 99 |
| 0.049 | 0.19 | 0.316 | 0.579 | 78 | |
| 0.0009 | 0.25 | 0.370 | 0.549 | 78 | |
| 0.0030 | 0.25 | 0.363 | 0.550 | 82 | |
| 0.0049 | 0.24 | 0.361 | 0.554 | 84 | 95 |
| 0.0099 | 0.25 | 0.342 | 0.558 | 82 | |
| 0.030 | 0.24 | 0.334 | 0.570 | 80 | 93 |
| 0.048 | 0.25 | 0.301 | 0.581 | 75 | 87 |
| 0.015 | 0 | 0.285 | 0.612 | 100 | 100 |

It can be concluded from the above Table 1 that the content of the copper activator should be from 0.003 to 0.03% by weight on the basis of ZnS and the content of the gold activator should be from 0.01 to 0.2% by weight on the basis of ZnS in order to obtain a phosphor which shows a chromaticity of the emission similar to the chromaticity of CdZnS:Cu phosphor, that is, a chromaticity with x=0.310 to 0.350 and y=0.560 to 0.600 on CIE chromaticity coordinates, and which shows a brightness of non-chromatic images on a cathode ray tube not lower than that obtained with a ZnS:Cu phosphor. The more preferred range of the content of the copper activator is from 0.01 to 0.018 by weight and the more preferred range of the content of the gold activator is from 0.015 to 0.08% by weight.

Following are the examples to illustrate the phosphors and the method for the preparation thereof in accordance with the invention in further detail.

EXAMPLE 1

A pasty blend was prepared with 100 g of zinc sulfide by the addition of an aqueous solution obtained by dissolving 0.104 g of chloroauric acid (HAuCl$_4$.4H$_2$O) corresponding to 0.049% by weight as gold based on the zinc sulfide, 0.039 g of copper sulfate (CuSO$_4$.5H$_2$O) corresponding to 0.0098% by weight as copper based on the zinc sulfide, and 0.5 g of ammonium iodide (NH$_4$I) in purified water, followed by the adjustment of the consistency with an additional portion of purified water. The pasty blend was dried at 120° C. for 12 hours and mixed with 0.2 g of aluminum fluoride powder uniformly. The powdered mixture thus obtained was packed in a quartz crucible and fired at 980° C. for 80 minutes in a hydrogen sulfide atmosphere, and cooled down to room temperature.

The product thus obtained was a zinc sulfide phosphor co-activated with copper and gold of pale yellowish green.

Determination of the spectral reflection factors and chemical analysis were carried out for the phosphor in order to ascertain the absence of free copper sulfide and/or gold sulfide on the surface of the phosphor crystallites. Curve 1 in FIG. 1 represents the spectral reflection factor of the powdery phosphor. Curve 2 in the same figure represents the spectral reflection factor of a conventional copper-activated zinc sulfide phosphor, ZnS:Cu, for comparison. The superiority of the phosphor of this invention in the spectral reflection factor is quite apparent from these data.

The procedure for the chemical analysis of the phosphors was as follows.

The phosphor was partially dissolved in 3 N. aqueous hydrochloric acid at 50° C. and the residue of the phosphor was washed successively with water and a 3% aqueous solution of potassium cyanide. Copper sulfide and gold sulfide, if they were deposited on the surface, would be dissolved off surely from the surface of the phosphor crystallites in this treatment. The residue was twice washed with water and the amounts of the activators in the phosphor were determined. The data in Table 2 show the relationship between the fractions of dissolved phosphor and the assay for the powdery crystallites as the residue obtained in a series of experiments with varied amounts of dissolved phosphor.

Table 2

| Fraction of Dissolved Crystallites (%) | Assay of the Activators in the Residual Crystallites (% by weight) | | |
|---|---|---|---|
| | Cu | Au | Al |
| 0 | 0.0098 | 0.049 | 0.012 |
| 22 | 0.0097 | 0.049 | 0.010 |
| 49 | 0.0098 | 0.047 | 0.0099 |
| 64 | 0.0099 | 0.047 | 0.010 |
| 71 | 0.0097 | 0.048 | 0.009 |

The testing results shown in Table 2 are a criterion for the distribution of the activators within the phosphor crystallites including the surface layer. The data in Table 2 support the uniformity in the distribution of the activators throughout the phosphor crystallites and absence of localization on the crystallite surface even when a comparison is made between the states before and after dissolution in hydrochloric acid.

It has been made sure that no segregation of free gold and copper is present on the surface of the zinc sulfide phosphor co-activated with copper and gold which is manufactured according to the present invention.

COMPARATIVE EXAMPLE 1

This comparative example was undertaken with the purpose to show the results of the conventional method for the preparation of a zinc sulfide phosphor co-activated with copper and gold using an ordinary aluminum source and an ordinary flux compound.

A pasty blend was prepared with 100 g of zinc sulfide by adding an aqueous solution obtained by dissolving 0.104 g of chloroauric acid ($HAuCl_4.4H_2O$) corresponding to 0.049% by weight as gold based on the zinc sulfide, 0.039 g of copper sulfate ($CuSO_4.5H_2O$) corresponding to 0.0098% by weight as copper based on the zinc sulfide, 0.167 g of aluminum nitrate ($Al(NO_3)_3.9H_2O$) corresponding to 0.012% by weight as aluminum based on the zinc sulfide and 0.5 g of potassium chloride in purified water, followed by the adjustment of the consistency with an additional portion of purified water. The pasty blend was dried at 120° C. for 12 hours. The dried mixture was packed in a quartz boat and fired at 960° C. for 80 minutes in an atmosphere of hydrogen sulfide. The crystalline powder thus obtained was a phosphor colored in grey indicating the deposition of free gold sulfide on the surface.

The spectral reflection factor of the powdery phosphor was determined in the same manner as in Example 1 and the results are shown as Curve 3 in FIG. 1. The values of the spectral reflection factor of the comparative phosphor are much lower than those of the phosphor according to the present invention and the presence of the substantial difference between them is convictive.

The comparative phosphor was further subjected to chemical analysis as in Example 1 and the assay is set out in Table 3.

Table 3

| Distribution of the Activators in the Crystallites of the Comparative Phosphor | | | |
|---|---|---|---|
| Fraction of Dissolved Crystallites (%) | Assay of the Activators in the Residual Crystallites (% by weight) | | |
| | Cu | Au | Al |
| 0 | 0.0098 | 0.048 | 0.011 |
| 25 | 0.0098 | 0.009 | 0.0054 |
| 51 | 0.0098 | 0.007 | 0.0052 |
| 62 | 0.0098 | 0.005 | 0.0049 |
| 75 | 0.0097 | 0.005 | 0.0048 |

The assay clearly demonstrates that gold is scarcely embedded in the inner part of the phosphor crystallites and mostly distributed near the surface layer of the crystallites.

The spectral energy distribution of the emission from the phosphor according to the present invention by excitation with cathode rays is shown by Curve 1 in FIG. 2. Also, the spectral energy distribution of the conventional phosphor, ZnS:Cu, the spectral energy distribution of the phosphor obtained in Comparative Example 1 and that of the conventional phosphor CdZnS:Cu are shown in the same figure as Curve 2, Curve 3 and Curve 4, respectively, for comparison. It is recognizable from FIG. 2 that the chromaticity of the emission from the phosphor according to the present invention is nearly equal to that of the conventional phosphor CdZnS:Cu and very satisfactory as the green-emitting phosphor for cathode ray tubes installed in color television sets. On the other hand, the phosphor obtained in Comparative Example 1 shows a chromaticity deviated toward blue as in the phosphor ZnS:Cu and cannot be suitably used as the green-emitting phosphor for the same use.

In comparison with a cathode ray tube for color television sets with a copper-activated zinc sulfide phosphor as the green emitter, about 10% of improvement in the non-chromatic brightness is obtained by the cathode ray tubes with the zinc sulfide phosphor co-activated with copper and gold of the invention, a silver-activated zinc sulfide phosphor and a europium-activated yttrium oxysulfide phosphor as the green, blue and red-emitting components, respectively.

EXAMPLE 2

A pasty blend was prepared with 100 g of zinc sulfide by the addition of an aqueous solution obtained by dissolving 0.208 g of chloroauric acid ($HAuCl_4.4H_2O$), 0.078 g of copper sulfate ($CuSO_4.5H_2O$) and 0.25 g of ammonium iodide ($NH_4I$) in purified water, followed by the adjustment of the consistency with an additional portion of purified water. The pasty blend was dried at 120° C. for 12 hours and mixed with 0.35 g of aluminum fluoride powder uniformly. The powdered mixture thus obtained was packed in a quartz boat and fired at 960° C. for 80 minutes in an atmosphere of hydrogen sulfide, and cooled to room temperature. The phosphor thus formed was, after treatment to remove the surface layer of the crystallites, washed with purified water and then passed through a 300 mesh screen to remove coarser particles. The powdery phosphor thus formed was pale yellowish and no segregation of free sulfides was observed on the surface of the crystallites. It was ascertained by the chemical analysis that the phosphor homogeneously contained 0.098% by weight of gold, 0.0196% by weight of copper and 0.024% by weight of aluminum, each based on the zinc sulfide. The spectral reflection factor and the spectral energy distribution of the emission from the phosphor were identical with Curve 1 in FIG. 1 and Curve 1 in FIG. 2, respectively. Further, the emission from the phosphor had a chromaticity of $x=0.315$ and $y=0.582$.

What we claim is:

1. A method for the preparation of a zinc sulfide phosphor co-activated with copper and gold expressed by the general formula:

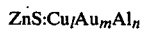

where
l is a number corresponding to the amount of copper from 0.003 to 0.03% by weight based on ZnS,
m is a number corresponding to the amount of gold from 0.01 to 0.2% by weight based on ZnS, and
n is a number corresponding to the amount of aluminum from 0.0025 to 0.04% by weight based on ZnS,
and wherein said phosphor so produced emits a light having a chromaticity in the range of $x=0.310$ to 0.350 and $y=0.560$ to 0.600 on CIE chromaticity corrdinates, said method comprising forming a mixtue by adding aluminum fluoride as a an aluminum ion source and ammonium iodide as a flux compound to powdery raw material for said phosphor composed of zinc sulfide and said copper and gold activator compounds, and firing said thus formed mixture at a temperature from 900° C. to 1000° C. in a hydrogen sulfide atmosphere to produce said phosphor that does not contain any segregated free sulfides of copper and gold on its surfaces.

2. The method for the preparation of a phosphor according to claim 1, in which aluminum flouride is added in an amount of from 0.1 to 1.0% by weight based on said powdery raw material for said phosphor.

3. The method for the preparation of a phosphor according to claim 1, in which ammonium iodide is added in an amount of from 0.1 to 1.0% by weight based on said powdery raw material for said phosphor.

* * * * *